(12) United States Patent
Fujiwara

(10) Patent No.: US 7,822,195 B2
(45) Date of Patent: Oct. 26, 2010

(54) TELEPHONE INTERFACE CIRCUIT

(75) Inventor: Yoshinobu Fujiwara, Tokyo (JP)

(73) Assignee: Uniden Corporation, Tokyo (JP)

( * ) Notice: Subject to any disclaimer, the term of this patent is extended or adjusted under 35 U.S.C. 154(b) by 1109 days.

(21) Appl. No.: 11/481,583

(22) Filed: Jul. 6, 2006

(65) Prior Publication Data

US 2008/0037773 A1    Feb. 14, 2008

(51) Int. Cl.
 *H04M 1/00* (2006.01)
(52) U.S. Cl. .................. 379/412; 379/402; 379/403; 379/413.01
(58) Field of Classification Search ................. 379/399.01–413.04
 See application file for complete search history.

(56) References Cited

U.S. PATENT DOCUMENTS

| 4,475,012 | A | * | 10/1984 | Coulmance | 379/360 |
| 4,580,011 | A | | 4/1986 | Glaser | |
| 4,694,483 | A | | 9/1987 | Cheung | |
| 4,709,296 | A | | 11/1987 | Hung et al. | |
| 5,392,349 | A | * | 2/1995 | Elder, Jr. | 379/412 |
| 6,418,222 | B2 | * | 7/2002 | Wong et al. | 379/412 |
| 6,782,098 | B1 | | 8/2004 | Fujiwara | |
| 7,206,403 | B2 | | 4/2007 | Fujiwara | |
| 2004/0228060 | A1 | | 11/2004 | Fujiwara | |
| 2007/0025549 | A1 | | 2/2007 | Fujiwara | |
| 2008/0037772 | A1 | | 2/2008 | Fujiwara | |
| 2008/0181391 | A1 | | 7/2008 | Fujiwara | |
| 2008/0285741 | A1 | | 11/2008 | Fujiwara | |

OTHER PUBLICATIONS

Co-pending U.S. Appl. No. 12/268,895, filed Nov. 11, 2008.

* cited by examiner

*Primary Examiner*—Fan Tsang
*Assistant Examiner*—Ibraham Sharifzada
(74) *Attorney, Agent, or Firm*—Steven J. Hultquist; Intellectual Property/Technology Law

(57) ABSTRACT

A telephone interface circuit comprises a first transistor for controlling opening and closing between a speech circuit and subscriber lines, a second transistor for controlling the first transistor to turn on and off, a positive feedback circuit connecting a collector terminal of the first transistor and a base terminal of the second transistor, an overcurrent detection circuit detecting overcurrent applied to the subscriber lines, and a breaker circuit for turning off the first transistor by lowering the base potential of the second transistor to a low potential when overcurrent is detected at the overcurrent detection circuit. Here, the base terminal of the first transistor and a collector terminal of the second transistor are connected. Further, when off-hook, the base potential of the second transistor is controlled in such a manner as to become a high potential by a microcomputer.

3 Claims, 3 Drawing Sheets

TELEPHONE INTERFACE CIRCUIT

BACKGROUND

The present invention relates to an interface circuit for protecting a telephone from overcurrents flowing in continuously due to transient overvoltages such as surge voltages or mixing etc. of mains power lines and subscriber lines.

A protection circuit is provided at an interface of a telephone and subscriber lines because of the possibility of a transient indirect lightening stroke accompanying a lightening strike being propagated to subscriber lines hanging in space or the possibility of overcurrents continuously flowing over a long period of time to a certain extent due to mixing with a mains power line. Configurations such as, for example, connecting a varistor element between two subscriber lines or connecting a varistor element between a subscriber line and earth are well-known as lightening surge countermeasures. When a transient surge voltage exceeding the varistor voltage is applied to a subscriber line, the surge voltage is absorbed as a result of the varistor element making a transition to conducting mode, and a speech circuit within the telephone is protected.

Further, configurations where, for example, a PTC thermistor (Positive Temperature Coefficient Thermistor) is interposed at an interface between a subscriber line and a telephone are also well known as a countermeasure for heating and combustion of a telephone due to mixing of subscriber lines and mains power lines. When an overcurrent flows into a PCT thermistor continuously over a certain period of time, input impedance of the interface increases in accompaniment with rise in element temperature and flowing in of overcurrents to within the telephone can be suppressed.

SUMMARY

However, in a telephone interface circuit using a semiconductor element for opening and closing a connection between a speech circuit and subscriber lines, strict adherence to ratings for current and voltage are necessary in order to avoid a secondary breakdown phenomenon peculiar to the semiconductor element, and use of an expensive Sidac (registered trademark) as a protection circuit is necessary.

The present invention therefore sets out to resolve the problem of providing a low-price telephone interface circuit capable of maintaining reliability of an interface circuit for protecting a telephone from the flowing in of overcurrents.

In order to resolve the aforementioned problems, a telephone interface circuit of the present invention comprises a first transistor for controlling opening and closing between a speech circuit and subscriber lines, a second transistor for controlling the first transistor to turn on and off, a positive feedback circuit connecting a collector terminal of the first transistor and a base terminal of the second transistor, an overcurrent detection circuit detecting overcurrent flowing in to the subscriber lines, and a breaker circuit for turning off the first transistor by lowering the base potential of the second transistor to a low potential when overcurrent is detected at the overcurrent detection circuit. Here, the base terminal of the first transistor and a collector terminal of the second transistor are connected. Further, when off-hook, the base potential of the second transistor is controlled in such a manner as to become a high potential by a microcomputer.

DETAILED DESCRIPTION

Figure 1:
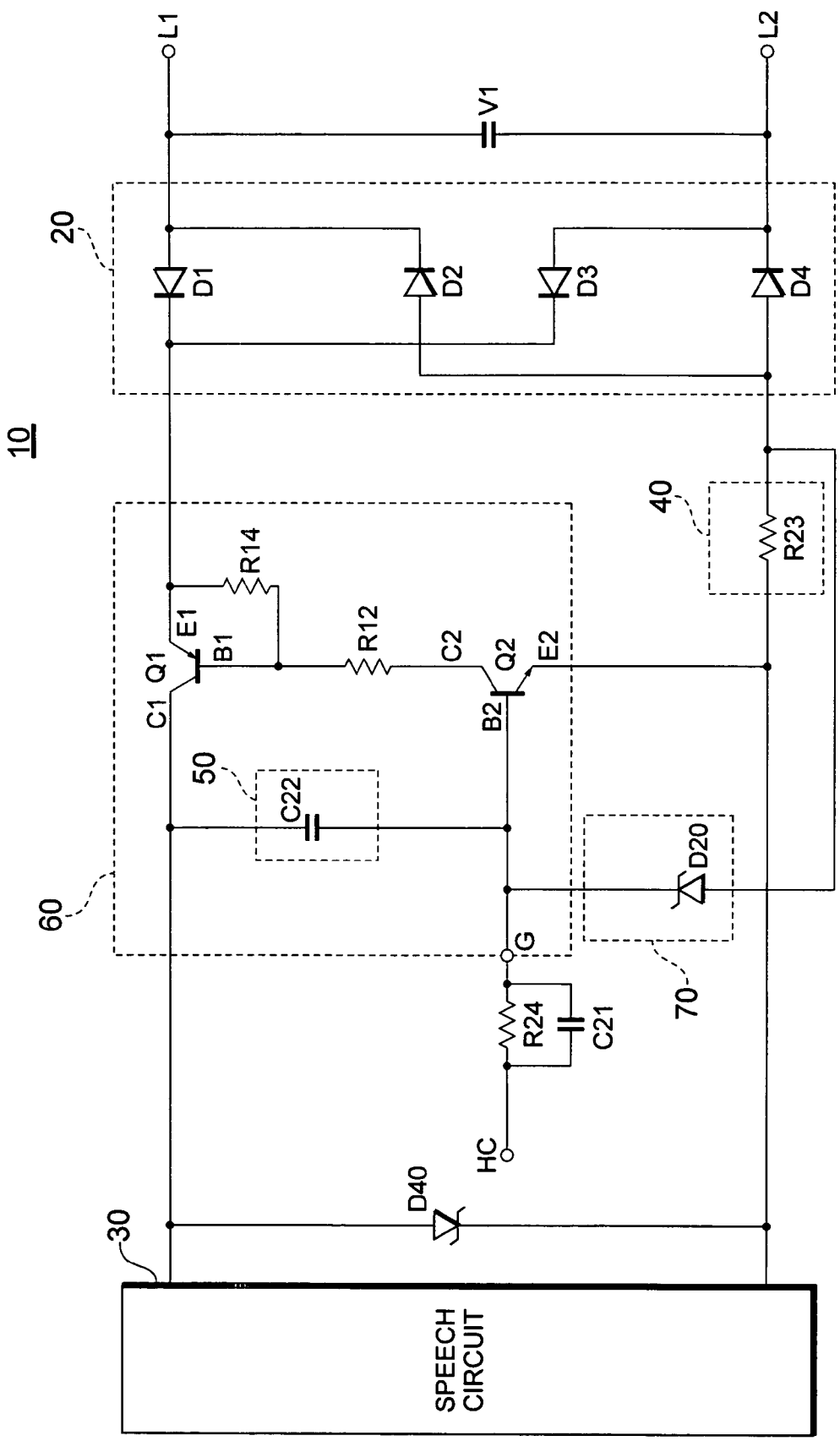
FIG. 1 is a circuit diagram of a telephone interface circuit of this embodiment.

FIG. 1 shows a circuit configuration for a telephone interface circuit 10 of this embodiment.

The telephone interface circuit 10 controls interfacing between a speech circuit 30 and subscriber lines L1, L2. The telephone interface circuit 10 is mainly comprised of a varistor element V1, Zener diode 40, diode bridge 20, transistors Q1, Q2, positive feedback circuit 50, overcurrent detection circuit 40, and breaker circuit 70.

The varistor element V1 is arranged at a front stage of the diode bridge 20, and absorbs overvoltage (for example, high voltages of 270V or more) between the subscriber lines L1 and L2.

The Zener diode 40 is arranged at a front stage of the speech circuit 30, and absorbs overvoltage (for example, high voltages of 9V or more) between the subscriber lines L1 and L2.

The diode bridge 20 regulates the signal flowing through the subscriber lines L1, L2 for supply to the speech circuit 30. The diode bridge 20 is configured from four diodes D1 to D4.

The overcurrent detection circuit 40 is a circuit for detecting overvoltages between the subscriber lines L1, L2. The overcurrent detection circuit 40 contains a resistor R23.

The breaker circuit 70 is a circuit for turning the transistor Q2 off by applying a reverse bias voltage across base terminal B2 and emitter terminal E2 of transistor Q2 when an overvoltage is applied between the subscriber lines L1, L2. Breaker circuit 70 contains a Zener diode D20.

When the telephone is off the hook, the transistor Q1 is turned on so as to connect the subscriber lines L1, L2 and speech circuit 30, while when the telephone is on the hook, the transistor Q1 is turned off so that the subscriber lines L1 and L2 and the speech circuit 30 are disconnected.

The emitter terminal E1 of transistor Q1 is connected to the subscriber line L1.

The base terminal B1 of the transistor Q1 is connected to collector terminal C2 of transistor Q2 via a resistor R12.

The collector terminal C1 of the transistor Q1 branches, with one branch connected to the speech circuit 30 and the other branch being connected to the positive feedback circuit 50. The positive feedback circuit 50 has a capacitor C22.

A resistor R14 is connected across emitter terminal E1 and base terminal B1 of transistor Q1.

Base terminal B2 of transistor Q2 branches into three, with one branch being connected to the positive feedback circuit 50, another branch being connected to the breaker circuit 70, and the remaining branch being connected to a microcomputer (not shown) via an RC circuit (a circuit containing a resistor R24 and a capacitor C21).

Emitter terminal E2 of the transistor Q2 is connected to the subscriber line L2 via the diode bridge 20.

As a result of the above circuit configuration, the transistors Q1 and Q2 and the positive feedback circuit 50 function as a Schmitt trigger 60. Namely, the base terminal B2 of transistor Q2 functions as a gate terminal G of the Schmitt trigger 60.

Transistor Q1 is a switching element comprised of a PNP transistor and transistor Q2 is a switching element comprised of an NPN transistor.

A terminal HC is connected to a microcomputer (not shown). The microcomputer (not shown) controls base potential of the transistor Q2 by controlling the potential of terminal HC at the time of an off-hook operation, on-hook operation, or dial pulse transmission operation, etc.

For example, when off-hook, the potential of the terminal HC is controlled to be a high potential as a result of control by the microcomputer (not shown). In doing so, as a result of the rise in potential of the terminal HC, the base potential of the transistor Q2 rises, and the transistor Q2 turns on. As a result, the base potential of transistor Q1 rises, and the transistor Q1 therefore turns on. The rise in the collector potential of the transistor Q1 is then positively fed-back to the base terminal B2 of transistor Q2 via the positive feedback circuit 50. At this time, the capacitor C22 has a function for shortening the turn on time of the transistor Q2.

When a dial input takes place in an off-hook state, the microcomputer (not shown) controls the potential of the terminal HC so as to correspond to the dial input. As a result, the transistor Q1 sends a dial pulse signal.

On the other hand, when on-hook, the potential of the terminal HC is controlled to be a low potential as a result of control by the microcomputer (not shown). As a result, the base potential of transistor Q2 falls, and the transistor Q2 therefore turns off. In doing so, the base potential of transistor Q1 falls, and the transistor Q1 therefore turns off.

Next, a description is given of the operation when an overvoltage is applied to the subscriber lines L1, L2.

When an overvoltage is applied to the subscriber lines L1, L2, a large voltage drop occurs at the overcurrent detection circuit 40. When this voltage drop exceeds the Zener voltage, the Zener diode D20 enters a breakdown state. The breaker circuit 70 then causes the base potential of the transistor Q2 to fall. At this time, a reverse bias voltage is applied across the base terminal B2 and emitter terminal E2 of the transistor Q2. The transistor Q2 therefore turns off the instant (within two microseconds) the overvoltage is applied across the subscriber lines L1, L2. In doing so, the base potential of transistor Q1 falls, and the transistor Q1 therefore also turns off.

The magnitude of the overcurrent necessary for the breaker circuit 70 to operate depends on the resistance of resistor R23, Zener voltage of Zener diode D20, and reverse bias voltage across the base and emitter in order to turn the transistor Q2 off, etc.

When an overvoltage is applied across the subscriber lines L1, L2 when off-hook, the breaker circuit 70 operates as described above, and the transistor Q1 is made to turn off. However, when off-hook, the terminal HC is controlled to be a high potential by the microcomputer (not shown), and the base potential of the transistor Q2 rises immediately. When the voltage across the base and emitter of the transistor Q2 exceeds the threshold voltage, the transistor Q2 is turned on again. As a result, the base potential of transistor Q1 rises, and the transistor Q1 is therefore also turned on again. In this way, the transistor Q1 has self-returning function. When the transistor Q1 turns on again due to this self-returning function, in the event that an overvoltage is applied across the subscriber lines L1, L2 as before, the breaker circuit 70 operates as described above, and the transistor Q1 is turned off. In this way, in the event that overvoltages are successively applied across the subscriber lines L1, L2, the transistor Q1 repeatedly alternates between a state of being turned on and a state of being turned off.

Figure 2:
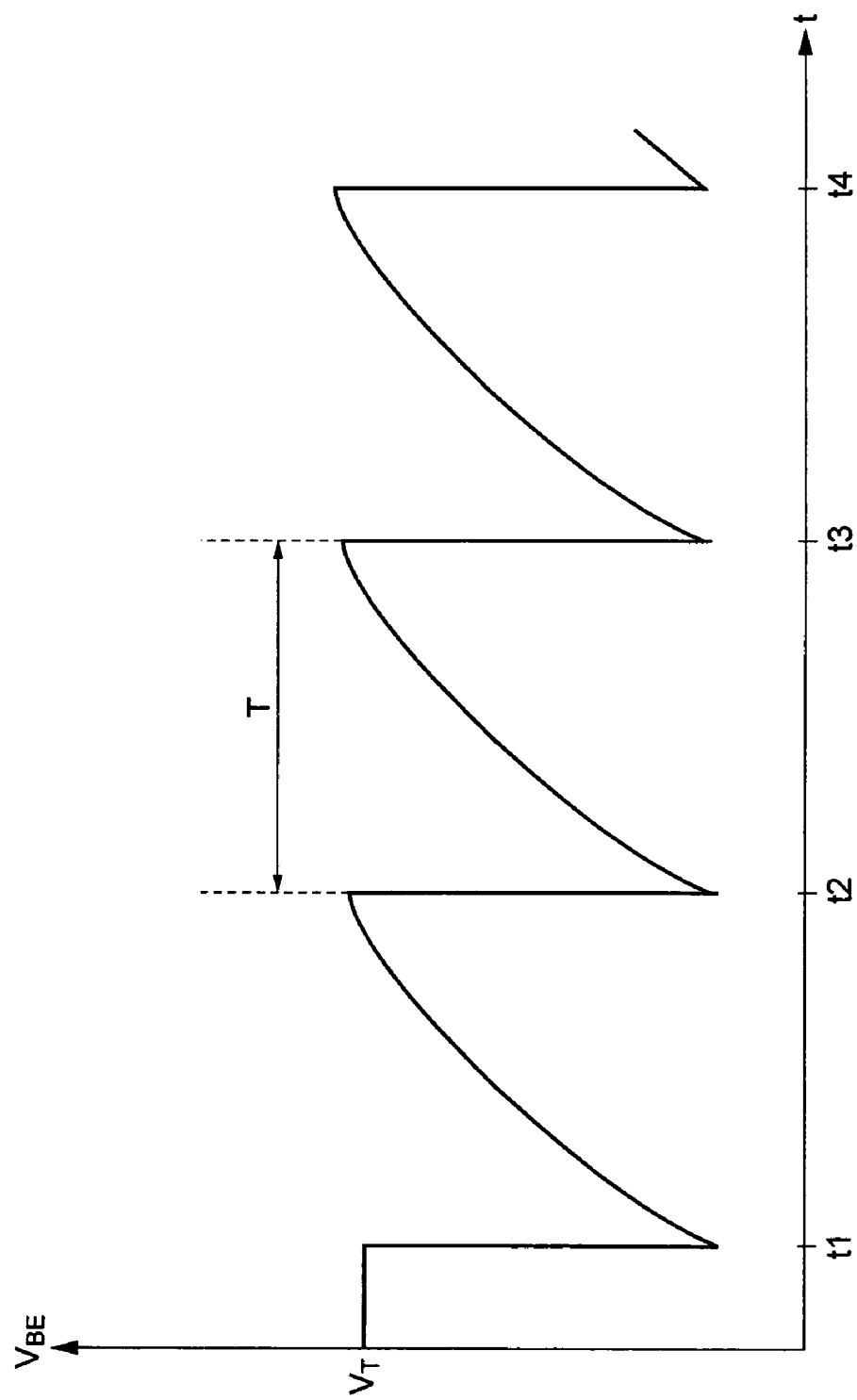
FIG. 2 is a graph showing change over time of a voltage across a base and an emitter of a transistor when an overcurrent is continuously applied to a subscriber line.

FIG. 2 shows the change in time of voltage VBE across the base and emitter of transistor Q2.

At time t1, when an overvoltage is applied across the subscriber lines L1, L2, the breaker circuit 70 operates and the transistor Q2 is made to turn off. However, in an off-hook state, the potential of terminal HC is controlled to a high potential. The voltage VBE across the base and emitter of transistor Q2 therefore immediately rises, and the voltage VBE reaches the threshold voltage VT at the time t2. In doing so, the transistor Q2 is turned on again. As an overvoltage is then applied continuously across the subscriber lines L1, L2, the breaker circuit 70 operates the instant the transistor Q2 is turned on, and the transistor Q2 is turned off. After this, the voltage VBE across the base and emitter of transistor Q2 rises immediately, and the voltage VBE reaches the threshold voltage VT at time t3. In doing so, the transistor Q2 is turned on again. As an overvoltage is then applied continuously across the subscriber lines L1, L2, the breaker circuit 70 operates the instant the transistor Q2 is turned on, and the transistor Q2 is turned off. The same operation is then repeated at time t4.

A period T where the transistor returns to being on from being turned off due to its self-returning function is determined by the size of the overvoltage applied across the subscriber lines L1, L2 and the time constant of the RC circuit (circuit containing resistor R24 and capacitor C21) connected to the base terminal B2 of the transistor Q2. The period the transistor Q1 is disconnected for is longer for a larger overvoltage applied across the subscriber lines L1, L2 and thermal fracturing due to collector loss of transistor Q1 can be suppressed.

Figure 3:
FIG. 3 is a graph showing change in time of a surge voltage applied across subscriber lines.
Figure 4:
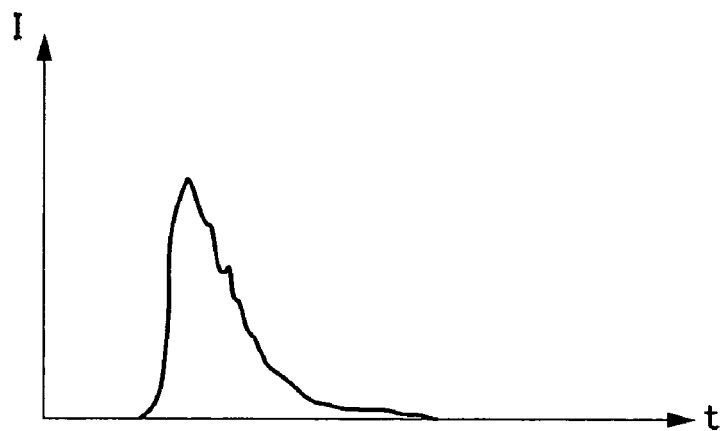
FIG. 4 is a graph showing change in time of a current passing through a transistor when a surge voltage is applied across subscriber lines in a telephone interface of the related art.
Figure 5:
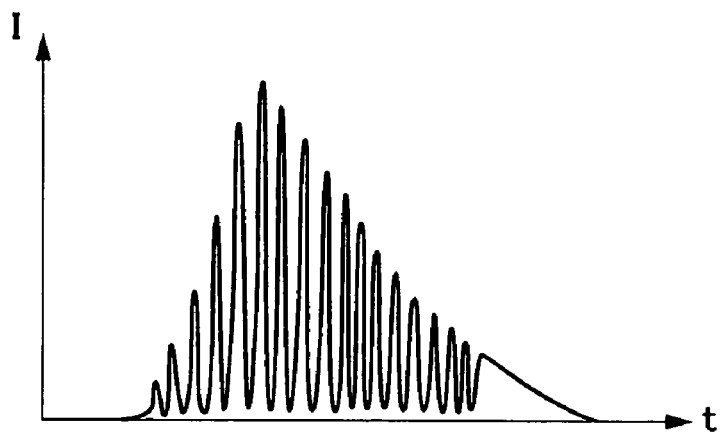
FIG. 5 is a graph showing change in time of a current passing through a transistor when a surge voltage is applied across subscriber lines in a telephone interface of this embodiment.

Next, a description is given of the results of this embodiment while referring to FIG. 3 to FIG. 5.

FIG. 3 shows a waveform for a surge voltage applied across subscriber lines L1, L2. In the same drawing, the horizontal axis shows time, and the vertical axis shows voltage.

FIG. 4 shows a waveform for current passing through transistor Q1 when the surge voltage shown in FIG. 3 is applied across subscriber lines L1, L2 at the telephone interface of the related art. In the same drawing, the horizontal axis shows time, and the vertical axis shows current.

FIG. 5 shows a waveform for current passing through transistor Q1 when the surge voltage shown in FIG. 3 is applied across subscriber lines L1, L2 at the telephone interface 10 of this embodiment. In the same drawing, the horizontal axis shows time, and the vertical axis shows current. In this drawing, the transistor Q1 repeatedly alternates between being turned on and being turned off, with it being shown that the period the transistor Q1 is disconnected for is longer for a larger overvoltage.

As described above, according to the telephone interface circuit 10 of this embodiment, it is possible to turn off the transistor Q1 the instant an overvoltage is applied across the subscriber lines L1, L2, and it is possible for the transistor Q1 to be restored by a self-returning function. In particular, it is possible for the period the transistor Q1 is disconnected for to be longer for a larger overvoltage applied across the subscriber lines L1, L2 and for thermal fracturing due to collector loss of transistor Q1 to be suppressed.

What is claimed is:

1. A telephone interface circuit comprising:
   a first transistor for controlling opening and closing between a speech circuit and subscriber lines;

a second transistor for controlling the first transistor to turn on and off;

a positive feedback circuit connecting a collector terminal of the first transistor and a base terminal of the second transistor;

a terminal connecting the base terminal of the second transistor and a microcomputer;

an overcurrent detection circuit detecting overcurrent applied to the subscriber lines; and a breaker circuit for turning off the first transistor by lowering the base potential of the second transistor to a low potential when the overcurrent is detected at the overcurrent detection circuit, wherein the base terminal of the first transistor and a collector terminal of the second transistor are connected, and when off-hook, the base potential of the second transistor is controlled in such a manner as to become a high potential by the microcomputer via the terminal.

2. The telephone interface circuit of claim 1, wherein the second transistor is made to self-return from being turned off to being turned on by the base potential of the second transistor being pulled up to a high potential by a microcomputer after being pulled down to a low potential by the breaker circuit.

3. The telephone interface circuit of claim 2, wherein the period the first transistor is disconnected for is longer for larger overvoltages applied to the subscriber lines.

* * * * *